United States Patent
Itoh et al.

(10) Patent No.: US 10,414,565 B2
(45) Date of Patent: Sep. 17, 2019

(54) HEAT-SHRINKABLE MULTILAYER FILM

(71) Applicant: Kureha Corporation, Tokyo (JP)

(72) Inventors: Tadayoshi Itoh, Tokyo (JP); Yuta Sekiya, Tokyo (JP); Hisanori Tobita, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 14/888,465

(22) PCT Filed: Apr. 28, 2014

(86) PCT No.: PCT/JP2014/061885
§ 371 (c)(1),
(2) Date: Nov. 2, 2015

(87) PCT Pub. No.: WO2014/178378
PCT Pub. Date: Nov. 6, 2014

(65) Prior Publication Data
US 2016/0152390 A1  Jun. 2, 2016

(30) Foreign Application Priority Data

May 2, 2013 (JP) ................................. 2013-096983

(51) Int. Cl.
*B65D 71/08* (2006.01)
*B32B 27/30* (2006.01)
(Continued)

(52) U.S. Cl.
CPC .............. *B65D 71/08* (2013.01); *A23L 13/00* (2016.08); *B29C 48/0018* (2019.02);
(Continued)

(58) Field of Classification Search
CPC ...... A23L 13/00; B29C 48/0018; B29C 48/08; B29C 48/10; B29C 48/91; B29C 48/9105;
(Continued)

(56) References Cited

U.S. PATENT DOCUMENTS 4,178,401 A * 12/1979 Weinberg ................ B32B 27/32
383/109
6,074,715 A    6/2000 Lind et al.
(Continued)

FOREIGN PATENT DOCUMENTS

EP    0 756 931 A2    2/1997
EP       1176002 A1 *  1/2002 ............. B32B 27/18
(Continued)

OTHER PUBLICATIONS

Mazyiar Sabet, Azman Hassan, Mat Uzir Wahit & Chantara T. Ratnam (2010) Mechanical, Thermal and Electrical Properties of Ethylene Vinyl Acetate Irradiated by an Electron-Beam, Polymer-Plastics Technology and Engineering, 49:6, 589-594, DOI: 10.1080/03602551003652755 (Year: 2010).*

(Continued)

*Primary Examiner* — John D Freeman
(74) *Attorney, Agent, or Firm* — Birch, Stewart, Kolasch & Birch, LLP

(57) ABSTRACT

A heat-shrinkable multilayer film for being filled with contents, comprising an outer surface layer (A) comprising a heat-resistant thermoplastic resin, an intermediate layer (B) comprising a polyamide-based resin, an inner surface layer (D) comprising an ethylene-based copolymer, and adhesion strength between inner surface layers after treatment with 80° C. hot water being not less than 10 N/15 mm. The polyamide-based heat-shrinkable multilayer film obtained in this manner has optimal characteristics for applications that primarily require strength, and has greatly improved self- (Continued)

weldability demanded in packaging films for meat products such as fresh and processed meats.

16 Claims, 4 Drawing Sheets

(51) Int. Cl.

| | | |
|---|---|---|
| B32B 27/34 | (2006.01) | |
| B32B 27/36 | (2006.01) | |
| B29C 48/10 | (2019.01) | |
| B29C 48/00 | (2019.01) | |
| B29C 48/88 | (2019.01) | |
| B29C 48/91 | (2019.01) | |
| B32B 27/28 | (2006.01) | |
| B29C 55/28 | (2006.01) | |
| B32B 27/08 | (2006.01) | |
| B65B 53/04 | (2006.01) | |
| B65D 65/38 | (2006.01) | |
| A23L 13/00 | (2016.01) | |
| B32B 27/20 | (2006.01) | |
| B29C 48/08 | (2019.01) | |
| B29K 105/00 | (2006.01) | |

(52) U.S. Cl.
CPC ............. *B29C 48/08* (2019.02); *B29C 48/10* (2019.02); *B29C 48/912* (2019.02); *B29C 48/9105* (2019.02); *B29C 48/919* (2019.02); *B29C 55/28* (2013.01); *B32B 27/08* (2013.01); *B32B 27/20* (2013.01); *B32B 27/28* (2013.01); *B32B 27/306* (2013.01); *B32B 27/34* (2013.01); *B32B 27/36* (2013.01); *B65B 53/04* (2013.01); *B65D 65/38* (2013.01); *B29C 48/91* (2019.02); *B29C 48/913* (2019.02); *B29K 2105/0067* (2013.01); *B29K 2995/0049* (2013.01); *B32B 2250/04* (2013.01); *B32B 2250/24* (2013.01); *B32B 2307/306* (2013.01); *B32B 2307/7242* (2013.01); *B32B 2307/746* (2013.01); *B32B 2439/70* (2013.01); *Y10T 428/1328* (2015.01); *Y10T 428/1352* (2015.01); *Y10T 428/3175* (2015.04); *Y10T 428/31786* (2015.04); *Y10T 428/31935* (2015.04)

(58) Field of Classification Search
CPC ... B29C 48/912; B29C 48/913; B29C 48/919; B29C 55/28; B29K 2105/0067; B29K 2995/0049; B32B 2250/04; B32B 2250/24; B32B 2307/306; B32B 2307/7242; B32B 2307/746; B32B 2439/70; B32B 27/08; B32B 27/20; B32B 27/28; B32B 27/306; B32B 27/34; B32B 27/36; B65B 53/04; B65D 65/38; B65D 71/08; Y10T 428/31786; Y10T 428/31935; Y10T 428/3175; Y10T 428/1328; Y10T 428/1352
See application file for complete search history.

(56) References Cited

U.S. PATENT DOCUMENTS

| | | |
|---|---|---|
| 6,270,867 B1 | 8/2001 | Eckstein et al. |
| 6,437,064 B1 | 8/2002 | Eckstein et al. |
| 6,511,568 B1 | 1/2003 | Eckstein et al. |
| 6,544,660 B1 | 4/2003 | Lind et al. |
| 6,699,549 B1 * | 3/2004 | Ueyama ............. B29C 47/0026 264/514 |
| 6,749,910 B1 * | 6/2004 | Georgelos ............. B32B 27/08 428/34.9 |
| 7,316,833 B1 | 1/2008 | Galloway et al. |
| 2001/0003624 A1 | 6/2001 | Lind et al. |
| 2003/0027008 A1 | 2/2003 | Eckstein et al. |
| 2003/0157350 A1 | 8/2003 | Ueyama et al. |
| 2004/0105994 A1 * | 6/2004 | Lu ......................... B29C 55/023 428/515 |
| 2010/0086711 A1 | 4/2010 | Kan Eta et al. |

FOREIGN PATENT DOCUMENTS

| | | |
|---|---|---|
| EP | 2 116 371 A1 | 11/2009 |
| EP | 0 756 931 B2 | 6/2011 |
| JP | H0313336 A | 1/1991 |
| JP | H1034800 A | 2/1998 |
| JP | 2010-234718 A | 10/2010 |
| JP | 4848020 B2 | 12/2011 |
| RU | 2248885 C2 | 3/2005 |
| WO | WO1999055528 A1 | 11/1999 |
| WO | WO2000047406 A1 | 8/2000 |
| WO | WO 01/98081 A2 | 12/2001 |
| WO | WO2008099799 A1 | 8/2008 |

OTHER PUBLICATIONS

European Patent Office Communication and extended search report issued in the corresponding European Patent Application No. 16201778.4 dated Mar. 14, 2017.
European Patent Office Communication and extended search report issued in the corresponding European Patent Application No. 16201783.4 dated Mar. 14, 2017.
European Patent Office Communication and extended search report issued in the corresponding European Patent Application No. 16201791.7 dated Mar. 14, 2017.
English translation of International Preliminary Report on Patentability and Written Opinion dated Nov. 3, 2015, in PCT International Application No. PCT/JP2014/061885.
Patent Examination Report No. 1 dated Mar. 29, 2016, in Australian Patent Application No. 2014260810.
International Search Report of PCT/JP2014/061885 dated Jul. 1, 2014.
Patent Examination Report No. 2 dated Aug. 22, 2016, in Australian Patent Application No. 2014260810.
Examination Report No. 3 dated Jan. 11, 2017, in Australian Patent Application No. 2014260810.
Extended European Search Report dated Nov. 14, 2016, in European Patent Application No. 14791785.0.
Notification of Reasons for Refusal issued in corresponding Japanese Application No. 2015-514848 dated Apr. 10, 2018.
Japanese Office Action dated Jan. 23, 2018 for corresponding Japanese Application No. 2015-514848, with English translation.
European Patent Office Communication pursuant to Article 94(3) EPC issued in the corresponding European Patent Application No. 14 791 785.0 on Jan. 2, 2019.
European Office Action for counterpart European Application No. 14791785.0, dated May 2, 2019.

* cited by examiner

HEAT-SHRINKABLE MULTILAYER FILM

TECHNICAL FIELD

The present invention relates to a heat-shrinkable multilayer film containing a polyamide-based resin layer as a primary resin layer and having excellent self-weldability for providing an excellent appearance to a wrapping excess portion of a shrink-wrapped article.

BACKGROUND ART

As package processing techniques for foods such as fresh meat, ham, sausages, cheese and other products, techniques in which a heat-shrinkable multilayer film is formed into a bag or pouch by a bag-forming machine and then filled with contents, or the contents are submitted to automatic packaging, either directly or loaded on a tray, during bag-forming processing have been conventionally used. Thus, the characteristics required of such a film for packaging are diverse, and an excellent balance of various characteristics such as heat-shrinkability, strength, heat resistance, moldability, suitability for various types of packaging, gas barrier capability, moisture barrier capability, and the like is required. As films suitable for packaging material applications that require strength above all, heat-shrinkable multilayer films containing a polyamide-based resin layer as a primary resin layer have been proposed.

Furthermore, when a meat product of indeterminate form, such as fresh fish or fresh meat or processed meat such as roast pork, beef or chicken, is packaged by being put in a packaging material such as a bag or pouch comprising a multilayer film, it is packaged by vacuum-packaging the meat product and then shrinking the packaging material using hot water of approximately 75 to 95° C., for example. Thus, it is preferable for the packaging material to exhibit good heat-shrinkability and to provide a good appearance by preventing seepage and retention of juice in the excess portion (normally called the "edge") between the contents and the seal portion used for forming a bag or pouch after packaging. To do so, it is desirable for the multilayer film to be suitable for fusing together of the inner surface resin layers of the edge of the bag or pouch filled with contents (called "self-welding" hereinafter) by heating during heat-shrinking. In other words, it is desirable for the inner surface layer of the multilayer film to exhibit "self-weldability." In particular, in the course of transport, storage, and the like after production of the packaged meat product described above, the self-welded inner surface layers of the edge peel due to shock such as collision with other articles or falling, and a pool of juice forms in the edge, appearance becomes poor, and a tight fit is not retained. Therefore, in the case of a packaged meat product that was packaged a long distance from the consumer or that will be consumed long after it was packaged, it is preferable for the adhesion strength of the inner surface layer by heat-shrinking (that is, self-weld strength) to be sufficiently high and close to the adhesion strength of the seal portion formed during packaging (that is, seal strength). Needless to say, like conventional food packaging films, such packaging films of meat products also require an excellent balance of various characteristics such as heat-shrinkability, strength, heat resistance, moldability, suitability for various types of packaging, gas barrier capability, and moisture barrier capability, as well as suitability for rapid sealing to enable rapid bag-forming and content filling. Additionally, packaging films for meat products such as fresh or processed meat also require transparency to enable visibility of the contents, gloss to provide a good appearance, and suitability for printing or label adhesion for displaying administrative information such as the location of production, producer, processing date, and processor.

However, the actual situation is that a multilayer film material that satisfies to a high degree the diversity of characteristics described above required in packaging films for meat products such as fresh and processed meat has not been obtained. For example, Patent Documents 1 to 3 disclose heat-shrinkable multilayer films having self-weldability, but when the above-described harsh transport or storage conditions incurred by packaged meat products are taken into consideration, the self-weldability thereof is not satisfactory, and their strength, surface gloss, suitability for printing, label adhesion, and rapid sealing are also insufficient.

CITATION LIST

Patent Literature

Patent Document 1: Japanese Patent No. 4255215B
Patent Document 2: Japanese Unexamined Patent Application Publication No. H10-34800A
Patent Document 3: Japanese Patent No. 4848020B

SUMMARY OF INVENTION

Technical Problem

In light of the above facts, a main object of the present invention is to provide a polyamide-based multilayer film having optimal characteristics for applications that require strength, and having greatly improved self-weldability demanded in packaging films for meat products such as fresh and processed meats.

A further object of the present invention is to provide a polyamide-based heat-shrinkable multilayer film provided with the surface gloss and suitability for printing or label adhesion desired in packaging applications for meat products such as fresh and processed meats.

Yet another object of the present invention is to provide a polyamide-based heat-shrinkable multilayer film having the heat-shrinkability, strength, heat resistance, suitability for various types of packaging, gas barrier capability, moisture barrier capability, and suitability for rapid sealing generally desired in films for food packaging.

Solution to Problem

Through research conducted by the present inventors, it was discovered that, to achieve the above objects, it is highly desirable to use a heat-resistant thermoplastic resin as an outer surface layer constituent resin in addition to a polyamide-based resin which constitutes an intermediate layer, and to use an ethylene-based copolymer having a certain melting point as an inner surface layer constituent resin to produce a greater mutual adhesion strength than in the past between the inner surfaces during hot water treatment. The heat-shrinkable multilayer film of the present invention is based on the above findings, and more specifically, when filled with contents, comprises an outer surface layer (A) comprising a heat-resistant thermoplastic resin, an intermediate layer (B) comprising a polyamide-based resin, an inner surface layer (D) comprising an ethylene-based copolymer, and has adhesion strength between inner surface layers after treatment with 80° C. hot water of not less than 10 N/15 mm.

BRIEF DESCRIPTION OF DRAWING(S)

DESCRIPTION OF EMBODIMENTS

Figure 1:
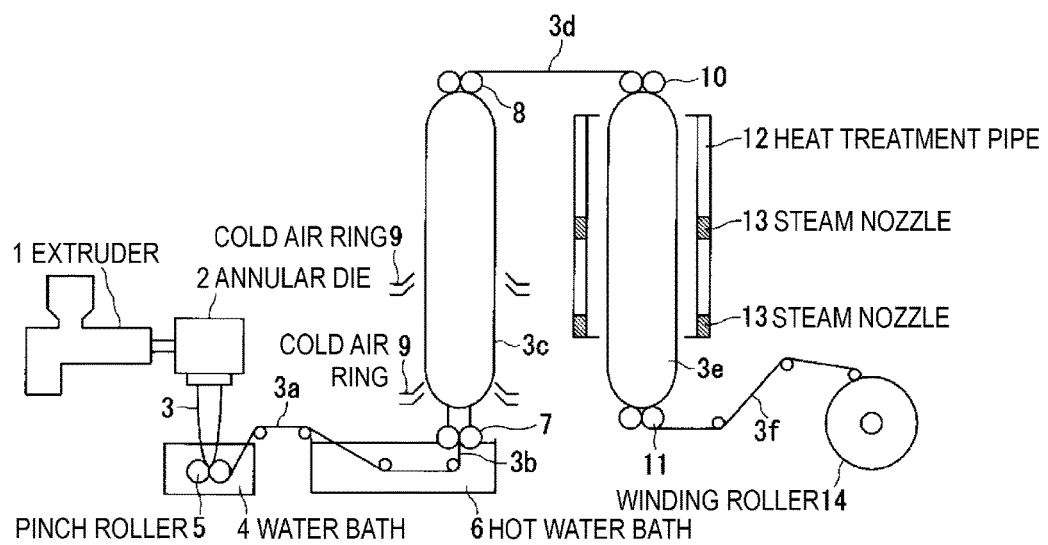
FIG. 1 is an explanatory diagram of an equipment system advantageous for production of the heat-shrinkable multilayer film of the present invention.

The heat-shrinkable multilayer film of the present invention comprises at least the three layers of an outer surface layer (A) comprising a heat-resistant thermoplastic resin, an intermediate layer (B) comprising a polyamide-based resin, and an inner surface layer (D) comprising an ethylene-based copolymer.

The outer surface layer (A) is a heat-resistant thermoplastic resin having a melting point of not less than 180° C., and preferably from 180 to 270° C., in order to provide excellent surface gloss, suitability for printing or label adhesion, and suitability for rapid sealing, among the characteristics required in the heat-shrinkable multilayer film of the present invention, due to having a melting point higher than that of the ethylene-based copolymer constituting the inner surface layer (D). When the main component of the surface layer (A) is a polyolefin-based resin, suitability for printing and label adhesion decrease dramatically.

Aliphatic polyester-based resins, aromatic polyester-based resins, aliphatic polyamide-based resins, aromatic polyamide-based resins, and the like are useful as the heat-resistant thermoplastic resin constituting the outer surface layer (A).

Aliphatic polyester-based resins and aromatic polyester-based resins may be used as the polyester-based resin that constitutes the outer surface layer (A). The dicarboxylic acid component used in the polyester-based resin may be one by which polyester is obtained by an ordinary production method, and in addition to terephthalic acid and isophthalic acid, examples include dimer acids comprising a dimer of an unsaturated fatty acid, adipic acid, oxalic acid, malonic acid, succinic acid, azaleic acid, sebacic acid, phthalic acid, 5-t-butylisophthalic acid, naphthalene dicarboxylic acid, diphenylether dicarboxylic acid, cyclohexane dicarboxylic acid, and the like. Two or more types thereof may also be used. The diol component used in the polyester-based resin may be one by which polyester is obtained by an ordinary production method, and examples include ethylene glycol, propylene glycol, tetramethylene glycol, neopentyl glycol, hexamethylene glycol, diethylene glycol, polyalkylene glycol, 1,4-cyclohexane dimethanol, 2-alkyl-1,3-propanediol, 1,4-butanediol, and the like. Two or more types thereof may also be used.

Preferred among these is an aromatic polyester-based resin containing an aromatic dicarboxylic acid component, and particularly preferred is a polyester containing terephthalic acid as the dicarboxylic acid component and a diol having not more than 10 carbons, for example, polyethylene terephthalate, polybutylene terephthalate, and the like. A copolymer polyester resin in which not less than 5 mol %, preferably not greater than 30 mol %, and more preferably not greater than 15 mol %, of the terephthalic acid is substituted with another dicarboxylic acid such as isophthalic acid or a copolymer polyester resin in which some of the diol component such as ethylene glycol is substituted with another diol such as 1,4-cyclohexanediol may also be preferably used. A mixture of two or more different types of polyester-based resin may also be used. Above all, a copolymer polyester in which some, preferably not greater than 30 mol %, and more preferably not greater than 15 mol %, of the terephthalic acid that constitutes polyethylene terephthalate is substituted with isophthalic acid is particularly preferred from the perspective of melt (co-)extrusion processability.

The polyester-based resin used preferably has an instinct viscosity of approximately 0.6 to 1.2. The outer surface layer (A) may also contain up to 20 mass % of a thermoplastic resin other than a polyester-based resin, such as a thermoplastic elastomer typified by thermoplastic polyurethane, or a polyolefin-based resin modified with an acid such as maleic acid or anhydride thereof.

As the polyamide-based resin that constitutes the surface layer (A), a mixture of 60 to 100 mass % of aliphatic polyamide and 0 to 40 mass % of amorphous aromatic polyamide is preferred, and, to provide the multilayer film with a good balance of stretchability and rigidity, a mixture of 60 to 95 mass % of aliphatic polyamide and 5 to 40 mass % of amorphous aromatic polyamide is preferred, and a mixture of 80 to 90 mass % of aliphatic polyamide and 10 to 20 mass % of amorphous aromatic polyamide is more preferred.

As the polyamide-based resin, aliphatic polyamide-based resins and amorphous aromatic polyamide-based resins are preferably used. The aliphatic polyamide is preferably one having a melting point of not less than 180° C. and not greater than 270° C., among which polyamide 6 (Nylon 6) polymer (melting point: approximately 225° C.), polyamide 6-66 (Nylon 6-66) copolymer (melting point: approximately 180 to 200° C.), polyamide 6-12 (Nylon 6-12) copolymer (melting point: approximately 180 to 200° C.), and polyamide 6-66-12 (Nylon 6-66-12) copolymer (melting point: approximately 180 to 190° C.) are preferred.

As the amorphous aromatic polyamide, a polycondensate with an aliphatic diamine, having isophthalic acid and terephthalic acid as main acid components, is used. As the acid component, a mixture containing from 40 to 98 mol % of isophthalic acid component and from 2 to 60 mol % of terephthalic acid is preferred. From the perspective of versatility, an amorphous Nylon copolymer commonly known as Nylon 6I-6T (Ny6I-6T), in which the aliphatic diamine comprises hexamethylene only, is particularly preferred.

Above all, a surface layer (A) in which the heat-resistant thermoplastic resin comprises a polyester-based resin has particularly excellent surface gloss and suitability for printing and label adhesion.

When the surface layer (A) comprising a heat-resistant thermoplastic resin is a polyester-based resin, it is preferably thinner than the intermediate layer (B), and in particular, not less than 6% and less than 50% of the thickness of the intermediate layer (B) is preferred because the excellent stretchability and mechanical characteristics of the intermediate layer (B) comprising polyamide-based resin to be described later are maintained.

The polyamide-based resin that constitutes the intermediate layer (B) preferably comprises 60 to 100 mass % of aliphatic polyamide and 0 to 40 mass % of amorphous aromatic polyamide. In particular, to provide the multilayer film with a good balance of stretchability and rigidity, a mixture of 60 to 95 mass % of aliphatic polyamide and 5 to 40 mass % of amorphous aromatic polyamide is preferred, and a mixture of 80 to 90 mass % of aliphatic polyamide and 10 to 20 mass % of amorphous aromatic polyamide is more preferred.

The aliphatic polyamide used preferably has a melting point of not less than 180° C. and not greater than 270° C. Above all, polyamide 6 (Nylon 6) polymer (melting point: approximately 225° C.), polyamide 6-66 (Nylon 6-66) copolymer (melting point: approximately 180 to 200° C.), polyamide 6-12 (Nylon 6-12) copolymer (melting point: approximately 180 to 200° C.), and polyamide 6-66-12 (Nylon 6-66-12) copolymer (melting point: approximately 180 to 190° C.) are preferred because extrusion processing thereof is easy.

As the amorphous aromatic polyamide, a polycondensate with aliphatic diamines, having isophthalic acid and terephthalic acid as main acid components, is used. As the acid component, a mixture containing from 40 to 98 mol % of isophthalic acid component and from 2 to 60 mol % of terephthalic acid is preferred. From the perspective of versatility, an amorphous Nylon copolymer commonly known as Nylon 6I-6T (Ny6I-6T), in which the aliphatic diamine comprises hexamethylene only, is preferred.

The polyamide-based resin that constitutes the intermediate layer (B) preferably contains from 5 to 40 mass % of amorphous aromatic polyamide. If the amorphous aromatic polyamide content is less than 5 mass %, stretch film producibility tends to be poor. On the other hand, if it is greater than 40 mass %, the rigidity of the multilayer film will be too high.

The layer thickness of the intermediate layer (B) comprising polyamide-based resin preferably accounts for greater than 15% and not greater than 50%, more preferably from 20 to 45%, and even more preferably from 25 to 40%, of the total thickness of the multilayer film of the present invention. If not greater than 15%, the film tends to be difficult to stretch. If the proportion of the thickness of the intermediate layer (B) is too great, flexibility of the film may be hindered. If necessary, up to 20 mass % of a thermoplastic resin other than a polyamide-based resin, such as an olefin resin modified with an acid such as maleic acid or anhydride thereof, ethylene-acrylic acid copolymer, ethylene-methacrylic acid copolymer, ionomer resin, or saponified ethylene-vinyl acetate copolymer, may be contained in the intermediate layer (B).

To avoid degradation, particularly degradation by permeating oxygen, of the meat product such as fresh or processed meat contained in the package, the heat-shrinkable multilayer film of the present invention may contain a gas barrier layer (C) comprising a gas barrier resin. Known gas barrier resins include partially saponified ethylene-vinyl acetate copolymers (usually called ethylene-vinyl alcohol copolymers (EVOH)), aromatic polyamides containing aromatic diamine such as polymetaxylene adipamide ("Nylon MXD6"), and the like, but preferred examples of the gas barrier resin that constitutes the gas barrier layer (C) are partially saponified ethylene-vinyl acetate copolymers having an ethylene content of 20 to 50 mol % and a degree of saponification of not less than 95%.

The gas barrier layer (C) accounts for from 2 to 20%, preferably from 3 to 18%, and more preferably from 3.5 to 15%, of the total thickness of the multilayer film of the present invention, and its thickness is from 2 to 20 μm and preferably from 2 to 10 μm.

To smoothly produce the heat-shrinkable multilayer film of the present invention and to provide it with its characteristic highly strengthened self-weldability, the type and composition of the ethylene-based copolymer that constitutes the inner surface layer (D) must be selected such that the adhesion strength between the inner surface layers (i.e., self-weld strength) when treated with 80° C. hot water after the inner surface layers are adhered to each other under vacuum-packaging conditions is not less than 10 N/15 mm. The melting point of the ethylene-based copolymer measured by DSC in conformance with JIS K7121 is preferably from 80 to 95° C., and particularly preferably from 85 to 95° C. If the melting point is less than 80° C., during production of the film by the inflation method, the melt co-extruded tubular parison cools, and when the parison is heated after being pinched by two rollers, the film fuses together and inflation and biaxial extrusion become difficult. If the melting point is greater than 95° C., the desired self-weld strength becomes difficult to obtain.

As an ethylene-based copolymer having such characteristics, one or a mixture of components selected from ethylene-vinyl acetate copolymer (EVA), ethylene-acrylic acid copolymer (EAA), ethylene-methacrylic acid copolymer (EMMA), ethylene-methyl acrylate copolymer (EMA), ethylene-ethyl acrylate copolymer (EEA), and ethylene-butyl acrylate copolymer (EBA) may be used. Self-weld strength tends to increase as the amount of small-quantity (generally less than 30 mass %) components that polymerize with the ethylene in the ethylene-based copolymer increases.

To achieve high self-weld strength of the multilayer film of the present invention, it is preferred for the crystal melting enthalpy ration at 80° C. and bellow (proportion of area of not greater than 80° C. to entire crystal melting enthalpy peak area) measured by DSC conforming to JIS K7121, is not less than 50% in the ethylene-based copolymer that constitutes the inner surface layer (D). The larger the crystal melting enthalpy ratio, the higher the self-weld strength. In particular, when this ratio is less than 50%, there are cases where the desired high self-weld strength is not achieved and the effect of preventing Juice oozing by an abuse test after an abuse test is not obtained.

The type and composition of the ethylene-based copolymer that constitutes the inner surface layer (D) is selected so as to provide the prescribed self-weld strength through control of the melting point and crystal melting enthalpy ratio described above, but above all, to provide high self-weld strength, an ethylene-vinyl acetate copolymer (EVA) having a vinyl acetate content from 15 to less than 25 mass % and a melting point of 80 to 95° C. is preferred. If the vinyl acetate content is less than 15 mass %, self-weld strength is insufficient, and if not less than 25 mass %, the odor of vinyl acetate tends to remain in the formed film and film production by the inflation method also becomes difficult.

The heat-shrinkable multilayer film of the present invention comprises the above-described outer surface layer (A) comprising a heat-resistant thermoplastic resin, an intermediate layer (B) comprising a polyamide-based resin, and an inner surface layer (D) comprising an ethylene-based copolymer as mandatory constituent layers, but if necessary, a gas barrier layer (C) may be provided as an intermediate layer. Known gas barrier resins include partially saponified ethylene-vinyl acetate copolymers (usually called ethylene-vinyl alcohol copolymers (EVOH)), aromatic polyamides containing a diamine such as polymetaxylene adipamide ("Nylon MXD6"), and the like, but preferred examples of the gas barrier resin are partially saponified ethylene-vinyl acetate copolymers having a ethylene content of 20 to 50 mol % and a degree of saponification of not less than 95%.

The heat-shrinkable multilayer film of the present invention contains the above-described outer surface layer (A) comprising a heat-resistant thermoplastic resin, an intermediate layer (B) comprising a polyamide-based resin, and an inner surface layer (D) comprising an ethylene-based copolymer as mandatory constituent layers, and may also contain a gas barrier layer (C) depending on the case, but the above-described adhesive resin layer may also be provided as an intermediate layer if necessary, such as when the adhesion strength between the above layers is not sufficient. As the adhesive resin, EVA, EEA, EAA, acid-modified polyolefins (reaction products of an olefin, copolymer thereof, or the like with an unsaturated carboxylic acid such as maleic acid or fumaric acid, an acid anhydride, ester or metal salt thereof, e.g., acid-modified VLDPE, acid-modified LLDPE, acid-modified EVA), and the like may be used. An advantageous example is an olefin resin modified with an acid such as maleic acid or anhydride thereof or the like.

Furthermore, the heat-shrinkable multilayer film of the present invention contains an outer surface layer (A) comprising a heat-resistant thermoplastic resin, an intermediate layer (B) comprising a polyamide-based resin, and an inner surface layer (D) comprising an ethylene-based copolymer as mandatory constituent layers, but if necessary, an inner layer (F) to improve moisture barrier capability may be provided as a layer adjacent to and on the inside of the inner surface layer (D). As the inner layer (F), one or a mixture of components selected from low-density polyethylene (LDPE), very-low-density linear polyethylene (VLDPE), linear low-density polyethylene (LLDPE), ethylene-propylene copolymer (PP-Et), ethylene-vinyl acetate copolymer (EVA), ethylene-acrylic acid copolymer (EAA), ethylene-methacrylic acid copolymer (EMMA), ethylene-methyl acrylate copolymer (EMA), ethylene-ethyl acrylate copolymer (EEA), and ethylene-butyl acrylate copolymer (EBA) may be used.

In the above layer configuration, organic lubricants, inorganic lubricants (antiblocking agents), and/or antistatic agents may be added to any layer. Organic and/or inorganic lubricants are preferably contained in, above all, the inner surface layer (D) or the outer surface layer (A) in order to improve film slipperiness when producing the film, bag-forming capability during secondary processing, and suitability for packaging machines during content filling. Additionally, the inner and outer surfaces of the film may be powdered with corn starch or the like if necessary.

Examples of organic lubricants that may be used include hydrocarbon-based lubricants, fatty acid-based lubricants, fatty acid amide-based lubricants, ester-based lubricants, metal soaps, and the like. The organic lubricants may be in liquid or solid form. Among these lubricants, fatty acid amide-based lubricants and metal soaps are preferred due to their miscibility with polyolefin resin. An organic lubricant is preferably used in the proportion of 0.1 to 2 mass % in the desired layers.

Examples of inorganic lubricants (antiblocking agents) that may be used include known inorganic fillers added to resin for the purpose of inhibiting adhesion of the film to itself, for example, talc, diatomaceous earth, silica, zeolite, calcium carbonate, aluminosilicate, and the like. For example, silica, aluminosilicate, zeolite, and the like are preferred from the perspectives of refractive index and dispersibility. The median volume average particle size D50 of the inorganic lubricant measured by Coulter counter is preferably from 0.5 to 10 µm, and more preferably from 1 to 7 µm. For an inorganic lubricant having this average particle size, it is even more preferable to cut the portion of particles greater than 10 µm. An inorganic lubricant is preferably used in the proportion of 0.05 to 2 mass % and particularly preferably 0.1 to 1 mass % in the desired layers.

The organic or inorganic lubricant is preferably added to the desired resin phase of the resins that constitute the desired layer or a resin miscible with it, as a master batch containing the lubricant in a concentration of, for example, from 1 to 10 mass %.

As an antistatic agent, a surfactant is preferably used. As surfactants, an anionic surfactant, cationic surfactant, non-ionic surfactant, amphoteric surfactant, or a mixture thereof may be used. An antistatic agent may be added as necessary in a proportion of 0.05 to 2 mass % relative to the resin of the layer to which it is added.

In the heat-shrinkable multilayer film of the present invention, the above layers are laminated, and the final thickness achieved by stretching and relaxation is from 10 to 200 µm, preferably from 15 to 150 µm, and more preferably from 20 to 150 µm.

More specifically, the outer surface layer (A) comprising a heat-resistant thermoplastic resin is preferably from 0.5 to 25 µm, particularly 1 to 15 µm; the intermediate layer (B) comprising polyamide-based resin is from 3 to 50 µm, preferably from 4 to 45 µm, in a range such that the proportion relative to the above total thickness is maintained; the gas barrier layer (C) is, for example, from 1 to 30 µm, preferably from 2 to 15 µm; the inner surface layer (D) comprising ethylene-based copolymer is in the range of 1 to 150 µm, preferably from 10 to 150 µm; and, when an inner layer (F) is provided adjacent to the inner surface layer (D), its thickness is from 5 to 100 µm (from 10 to 150 µm as the total including the inner surface layer (D)). When the thickness of the inner surface layer (D) is less than 10 µm, seal strength tends to be unsatisfactory, and even if an inner layer (F) is provided, when the thickness of the inner surface layer (D) is less than 1 µm, it may melt and flow when heat sealing is performed, and sealing capability may be lost. On the other hand, when the thickness of the inner surface layer (D) (or the total thickness including the inner layer (F)) is greater than 150 µm, stretchability may be poor.

A plurality of adhesive resin layers may be provided, but the thickness of each is preferably from 0.5 to 5 µm.

The heat-shrinkable multilayer film of the present invention may be produced by the tenting method, but it is more preferably produced as follows by the inflation method.

A tubular multilayer film is formed by co-extruding at least three types of melted thermoplastic resin in tubular form from a number of extruders corresponding to the number of types of laminated resin (at least three) that constitute the multilayer film, to form a tubular body having an outer surface layer (A) comprising a heat-resistant thermoplastic resin, an intermediate layer (B) comprising a polyamide-based resin, an inner surface layer (D) comprising an ethylene-based copolymer, and, depending on the case, further containing a gas barrier layer (C) and/or an inner layer (F); water-cooling the tubular body to not greater than the melting point of the primary resin contained in each of the layers; reheating the tubular body using 75 to 90° C. hot water; stretching the tubular body 250% to 400% in the vertical direction and the circumferential direction while pulling it in the vertical direction while inserting fluid inside the tubular body, to form a biaxially stretched tubular film;

performing relaxation heat treatment using 60 to 98° C. steam or hot water from the side nearest the outer surface layer (A) of a tubular body that was re-formed by folding the biaxially stretched tubular film and inserting fluid inside of it such that the respective relaxation ratios in the vertical direction and the circumferential direction are from 2 to 25%; and then cooling. The tubular heat-shrinkable multi-layer film formed in this manner itself corresponds to the heat-shrinkable multilayer film of the present invention and may be used unaltered as a material for automated packaging of meat products, but it may be prepared as packaging material in the form of a long flat film for automated packaging by cutting it in advance along the long direction, or, by cutting, it may be prepared as individual cylindrical bag-shaped or pouch-shaped packaging materials of which one end has been shrunk and pre-sealed. More specifically, referring to FIG. 1, the tubular heat-shrinkable multilayer film described above is produced by, for example, the following method using the inflation method.

A tube (parison) 3 containing an outer surface layer (A) comprising a polyester-based resin, an intermediate layer (B) comprising a polyamide-based resin, and an inner surface layer (D) comprising an ethylene-based copolymer is co-extruded through an annular die 2 from a number of extruders (only one extruder is illustrated) corresponding to the number of types of laminated resin that constitute the multilayer film, and it is taken up by pinch rollers 5 while being cooled by a water bath 4 to a temperature not greater than the melting point of the primary resin contained in each of the layers, and preferably to not greater than 40° C. Then, the taken-up tubular film 3a is introduced into a hot water bath 6 having a temperature not greater than the melting point of the primary resin contained in each of the layers, for example, 75 to 90° C., while an antiblocking agent typified by soybean oil or the like is enclosed as necessary. The heated tubular film 3b is then drawn upward, and a bubble-shaped tube 3c is formed by fluid air introduced between a pair of pinch rollers 7 and 8. While being cooled with an air ring 9 at a temperature of 10 to 20° C., it is simultaneously biaxially stretched in the vertical direction (MD) and the circumferential direction (TD) at a relatively low and limited stretch ratio, i.e., a stretch ratio from 250 to 400%, and preferably from 280 to 400%, in the MD and the TD. Then, the tubular film 3d after stretching is drawn downward, and a bubble-shaped tube 3e is again formed by fluid air introduced between a pair of pinch rollers 10 and 11, and then it is held inside a heat-treatment pipe 12. Then, steam is blown (or hot water is sprayed) from nozzles 13 of the heat-treatment pipe 12, and the tubular film 3e after biaxial stretching is heat-treated for 1 to 20 seconds, preferably 1.5 to 10 seconds, at 60 to 98° C., preferably 60 to 80° C., to relax (shrink) the tubular film 3e by 2 to 25% each in the vertical direction (MD) and transverse direction (TD), and preferably by 5 to 15% in each direction. The tubular film 3f after heat treatment corresponds to the heat-shrinkable multilayer film of the present invention, and is wound onto a winding roller 14.

The film may be irradiated by a known method before or after stretching in the production method of the heat-shrinkable multilayer film described above.

The heat-shrinkable multilayer film of the present invention produced in the above manner is characterized in that the adhesion strength between inner surface layers after 80° C. hot water treatment is not less than 10 N/15 mm. If the self-weld strength is less than 10 N/15 mm, adhesion strength is unsatisfactory, and in particular, in the course of transport, storage, and the like after production of the packaged meat product, the self-welded inner surface layers of the edges peel due to shock such as collision with other articles or falling, and pools of juice form in this portion. The self-weld strength is preferably not less than 12 N/15 mm, more preferably not less than 14 N/15 mm, and particularly preferably not less than 18 N/15 mm. The upper limit of the self-weld strength is not particularly limited, and is determined as the rupture strength of the substrate film. Additionally, preferred characteristics of the heat-shrinkable multilayer film of the present invention are a shrinkage ratio in 80° C. hot water of not less than 20% and more preferably not less than 25% each in the MD and TD, and even more preferably not less than 25% in the MD and not less than 30% in the TD, haze of not greater than 10%, gloss of not less than 100%, oxygen permeability (23° C., 80% RH) of not greater than 100 $cm^3/m^2/24$ h·atm, and moisture permeability (40° C., 90% RH) of not greater than 40 $g/m^2/24$ h.

Figure 2:
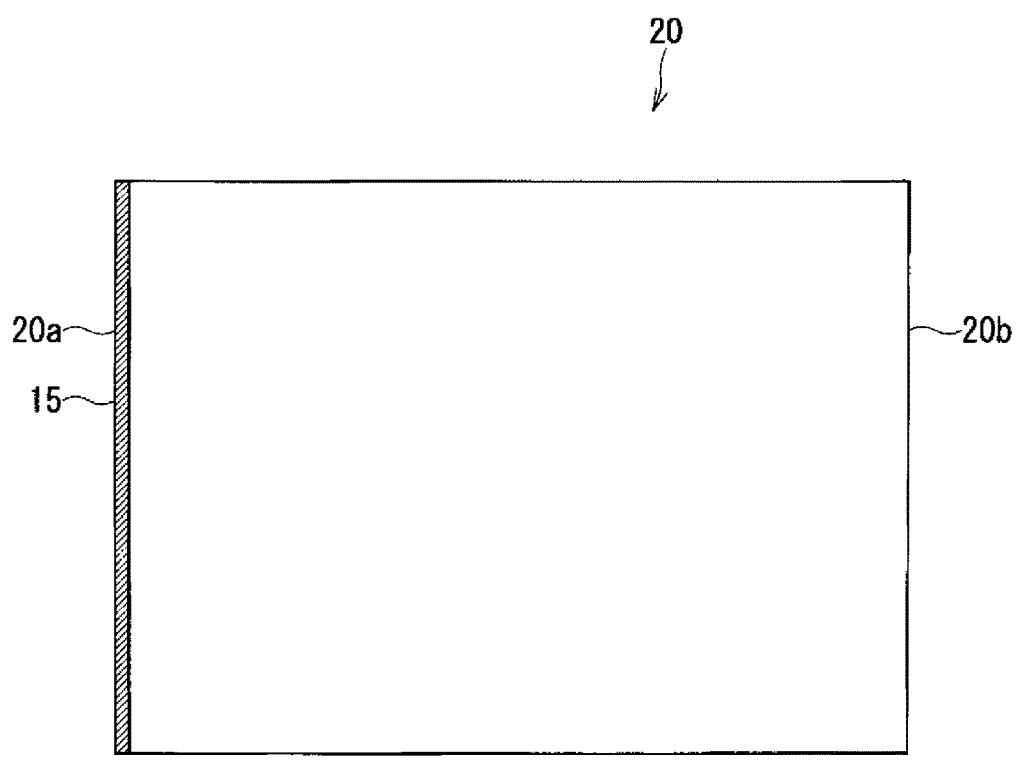
FIG. 2 is a plan view of a bag-shaped packaging material as an example of a packaging material formed from the heat-shrinkable multilayer film of the present invention.
Figure 3:
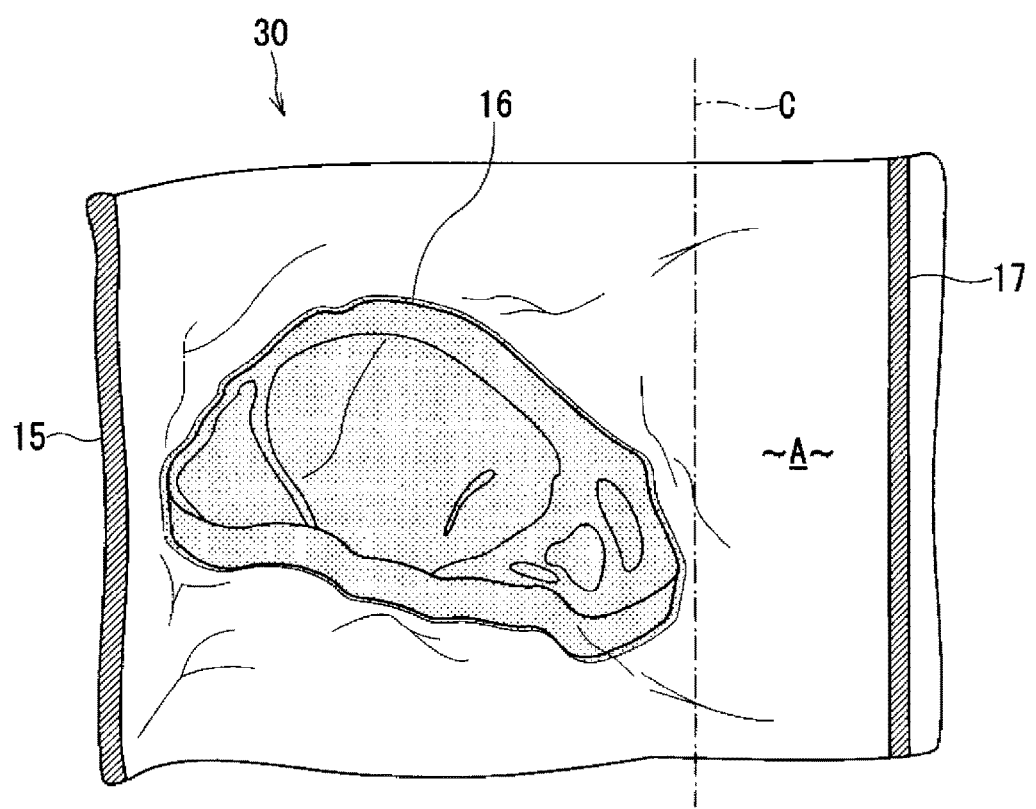
FIG. 3 is a schematic perspective view illustrating a state after a block of fresh meat has been vacuum-packaged and stored using the bag-shaped packaging material of FIG. 2.
Figure 4:
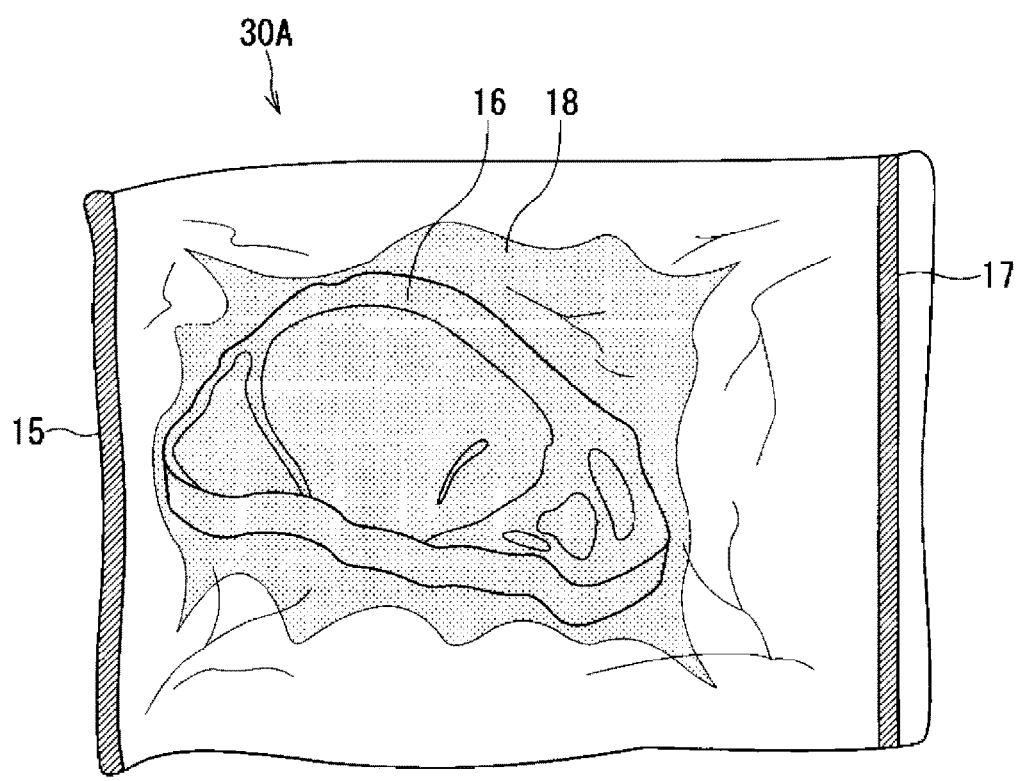
FIG. 4 is a schematic perspective view corresponding to FIG. 3, illustrating a state after a block of fresh meat has been vacuum-packaged and stored using a bag-shaped packaging material comprising a conventional heat-shrinkable multilayer film that is not self-weldable.

The obtained heat-shrinkable multilayer film of the present invention, as illustrated in FIG. 2 (plan view) as an example, has the form of a hollow cylindrical packaging bag 20 in which a seal portion 15 is formed at one end 20a, and the other end 20b is open. As illustrated in FIG. 3, a meat product 16 such as fresh meat is inserted into the packaging bag 20 from the open end 20b side, and a seal portion 17 is formed on the end 20b side while evacuating, to vacuum-package the meat product 16. Then, by heat treatment of immersing in or showering with, for example, 80° C. (generally 75 to 85° C.) hot water for 3 seconds (generally 1 to 20 seconds), the film that forms the packaging bag 20 is heat-shrunk, and at the same time, the film inner surface layers surrounding the meat product, including the intermediate region A between the seal portion 17 and the meat product 16, fuse (self-weld) to each other, resulting in a packaged meat product 30. In the packaged meat product 30 formed in this manner, as illustrated in the sketch of FIG. 3, juice does not seep out around the periphery even after the vacuum package containing 1.5 kg of beef round in a bag material measuring, for example, approximately 25 cm×35 cm is refrigerated for approximately one month at a low temperature of 0° C. In contrast, with a packaged meat product 30A similarly formed by vacuum-packaging and heat-shrinking but using a packaging bag comprising a heat-shrinkable multilayer film lacking self-weldability of the inner layers, as illustrated in the sketch of FIG. 4, the juice seeps out around the meat product 16 and forms pools of juice 18 when similarly refrigerated for approximately one month at 0° C.

A consumer who has purchased the meat product 30 obtained in the above manner can remove the meat product from the packaging bag by cutting a notch C using a knife or the like at a position near the meat product 16 and detaching the edge A as illustrated in FIG. 3.

EXAMPLES

The present invention will be described in detail hereinafter based on working examples and comparative examples, but the present invention is not limited to these examples. Note that the methods for measuring the physical properties listed in the specification of the present application are as follows.

Measurement of Melting Point and Crystal Melting Enthalpy Ratio

The melting point (Tm) was measured by DSC (differential scanning calorimeter) in conformance with JIS K7121. To determine the crystal melting enthalpy ratio, a DSC curve for the sample resin was determined by heating to 200° C. in conformance with JIS K7121. Then, the entire crystal melting enthalpy was determined based on the peak area of the temperature range from the start to the end of melting. The crystal melting enthalpy at a specified temperature (80° C.) and below was determined of the area of that portion based on the results of calculating the entire crystal melting enthalpy. Then, the crystal melting enthalpy ratio was determined by the following formula.

Crystal melting enthalpy ratio (%)=(crystal melting enthalpy value at specified temperature (80° C.) and below)/(entire crystal melting enthalpy value)×100

Hot Water Shrinkage Ratio

The hot water shrinkage ratio of the heat-shrinkable multilayer film was measured by the following method in conformance with ASTM D2732. Specifically, a sample with marks printed 10 cm apart in the MD (vertical direction) and in the TD (transverse direction) of the heat-shrinkable multilayer film was immersed for 10 seconds in 80° C. hot water and then removed. It was immediately cooled with room-temperature water, and then the distance between marks was measured. The measured value was subtracted from 10 cm, and the ratio of the obtained value divided by 10 cm was taken as the hot water shrinkage ratio (units:%) displayed as a percentage for the TD and for the MD (average value of n=5 samples). From the perspectives of appearance, transparency, and storability of the vacuum-packaged meat product, the hot water shrinkage ratio is preferably not less than 20% and more preferably not less than 25% in both the MD and the TD, and particularly preferably, it is not less than 25% in the MD and not less than 30% in the TD.

Density and Melting Point

The density of the resin materials was measured in conformance with ASTM D1505, and the melting point was measured in conformance with JIS K7121.

MFR

The MFR of the resin materials was measured at 190° C. under load of 21.18 N using a melt indexer manufactured by Toyo Seiki Seisaku-Sho, Ltd., in conformance with ASTM D1238.

Haze

The transparency of the heat-shrinkable multilayer film was measured as haze (units:%) using a haze meter NDH-2000 manufactured by Nippon Denshoku Industries Co., Ltd., in conformance with JIS K7105 (average value of n=5 samples). To improve transparency of the packaged meat product, it is preferred that haze is not greater than 10%.

Gloss

As the gloss (units:%) of the heat-shrinkable multilayer film, the gloss on a roll surface was measured for the TD and for the MD using a glossmeter VG-2000 manufactured by Nippon Denshoku Industries Co., Ltd., in conformance with JIS Z8741 (average value of n=5 samples). To improve the appearance of the packaged meat product, it is preferred that gloss is not less than 100%.

Puncture Strength

Using a tensile tester (Tensilon RTM-100 manufactured by Orientec Co., Ltd.) equipped with a puncturing pin having a hemispherical tip with radius of curvature 0.5 mm, a sample multilayer film was punctured from the outer surface layer (A) side with the puncturing pin at a speed of 50 mm/min in an atmosphere at 23° C., 50% RH. Five samples were measured, and the average value was calculated.

Puncture strength is preferably not less than 15 N, which is effective in inhibiting tears and pin holes due to collision or falling particularly when distributing packages containing hard or protruding food such as bony meat. It also enables improvement of pin hole resistance in an abuse test. The configuration of the intermediate layer (B) comprising a polyamide-based resin is the primary factor in improving puncture strength.

Seal Strength

For measuring the seal strength of the heat-shrinkable multilayer film, a sample was created by impulse sealing under the following conditions using a vacuum packer (Multivac AGW). Sealing time: 2 seconds; sealing pressure: 1 kg/cm$^2$; sealing bar width: 1 mm; sealing temperature: 160±2° C.

Then, after the sample was allowed to stand for 2 hours in an atmosphere at 23° C. and 50% RH, the impulse sealed portion of the sample was measured by the method described below. The measured value was expressed as the average value of n=5 samples. To improve the overall strength of the vacuum-packaged product, the seal strength is preferably not less than 15 N/15 mm, and this seal strength is preferably assured even in rapid sealing.

Measurement device: Tensile tester Tensilon RTM-100 manufactured by Orientec Co., Ltd.

Distance between chucks: 20 mm

Chuck speed: 300 mm/min

Sample width: 15 mm

Temperature: 23° C.

Humidity: 50% RH

Oxygen Permeability

The oxygen permeability of the heat-shrinkable multilayer film was measured at 23° C. and relative humidity (RH) 80% using OX-TRAN model 2/20 manufactured by Modern Controls, Inc., in conformance with ASTM D3985-81. The units are cm$^3$/m$^2$·24 h·atm. From the perspective of preventing degradation of contents, the oxygen permeability is preferably not greater than 100 cm$^3$/m$^2$·24 h·atm.

Moisture Permeability

The moisture permeability of the heat-shrinkable multilayer film was measured at 40° C. and relative humidity (RH) 90% using PERMATRAN model W3/31 manufactured by Modern Controls, Inc., in conformance with ASTM F372-73. The units are g/m$^2$/24 h. From the perspective of preventing ullage of the contents, moisture permeability is preferably not greater than 40 g/m$^2$/24 h.

Film Producibility

Film producibility was evaluated based on the following criteria based on stability of a stretch bubble formed by the inflation method.

A: Film can be produced by inflation, and stretch bubble nearly does not fluctuate.

B: Film can be produced by inflation, but stretch bubble fluctuates and lacks stability, and there are wrinkles in film.

C: Film cannot be produced by inflation.

Bag-Forming Processability

The bag-forming processability of the heat-shrinkable multilayer film (folded width 350 mm) was evaluated based on the following criteria by forming a bag (width 350 mm, length 500 mm) of the heat-shrinkable multilayer film using a bag maker model BM37 manufactured by Kureha Corp.

Bag-Forming Processability Evaluation Criteria

A: During continuous operation for 8 hours, the produced bag was fed smoothly to the subsequent step and wrinkles were not generated in the bag when produced.

B: Generation of wrinkles in the bag was seen when produced, but the produced bag was fed to the subsequent step.

C: The produced bag got caught near the sealing portion of the bag maker, and continuous operation was difficult.

Bag Openability

The bag openability of the heat-shrinkable multilayer film was evaluated based on the following criteria by producing a bag sealed on one end and open on the other end from the heat-shrinkable multilayer film using a bag maker model BM37 manufactured by Kureha Corp.

Bag Openability Evaluation Criteria

A: When the bag was placed on a horizontal surface and the top side of the opening of the bag was lifted up, the entire inner side of the bag opened.
B: When the bag was placed on a horizontal surface and the top side of the opening of the bag was lifted up, a part of the inner side of the bag adhered.
C: When the bag was placed on a horizontal surface and the top side of the opening of the bag was lifted up, substantially the entire inner side of the bag adhered.

Self-Weldability

—Inner Side Adhesion Strength (Self-Weldability) Measurement—

As a sample, a bag measuring 200 mm wide×250 mm long sealed on three sides by impulse sealing was produced, and as the article to be packaged, fresh meat (approximately 600 g) measuring approximately 80 mm wide, 80 mm thick, and 100 mm long was put in the pouch, and a vacuum package was obtained using a vacuum packer (Multivac AGW). The package was immersed for approximately 3 seconds in 80° C. hot water to heat-shrink it, and then immediately cooled with cold water, and a sample for self-weld strength measurement was obtained. After the obtained sample was allowed to stand (humidified) for 1 day in an atmosphere at 23° C. and 50% RH, the adhesion strength between the inner sides of the edges of the sample (self-weld strength) was measured by the method described below. The measured value was expressed as the average value of n=5 samples.

Measurement device: Tensile tester Tensilon RTM-100 manufactured by Orientec Co., Ltd.
Distance between chucks: 20 mm
Chuck speed: 300 mm/min
Sample width: 15 mm
Temperature: 23° C.
Humidity: 50% RH Abuse Test Determination Sample Creation As a sample, a pouch (bag) measuring 200 mm wide×250 mm long sealed on three sides by impulse sealing was produced, and as the article to be packaged, fresh meat (approximately 600 g) measuring approximately 80 mm wide, 80 mm thick, and 100 mm long was put in the pouch, and after evacuation, and opening was heat-sealed to produce a package. The obtained package was immersed for approximately 3 seconds in 80° C. hot water to heat-shrink it, and then immediately cooled with cold water, and after allowing to stand for 1 day in a refrigerator at 5° C., a sample for abuse testing was obtained. The sample was used in the following evaluation of "juice visibility determination."

Abuse Test

Ten packages filled with fresh meat were left to stand for 8 hours in a refrigerator at 5° C., and then they were randomly put into a regular hexagonal cylindrical box made of hard vinyl chloride resin adjusted to 5° C., and while that temperature was maintained, they were rotated for 10 minutes at 30 rpm with the center line of the regular hexagonal column as the axis. Then, the 10 fresh meat-filled packages were removed, and after being left to stand for 8 hours in a refrigerator at 5° C., the number of packages in which peeling had occurred at the fused portion of the inner sides of the film and juice had seeped out to the peeled portion was counted. As for the boxes, the length of one side of the regular hexagon was 20 cm, the length of the cylinder was 61.5 cm, and the thickness of the resin plate constituting the box was 0.5 cm. In the box, three obstruction plates made of hard vinyl chloride resin having an oblong shape were provided facing the rotation axis of the box from three specified alternating vertices among the six vertices of the regular hexagon. As for the obstruction plates, the length of the side extending toward the rotation axis was 7.8 cm, the length of the other side was the same, and the thickness was 0.5 cm.

Juice Visibility Determination

The determination was made according to the number of samples in which juice had infiltrated due to peeling of the inner sides of the film from each other, and it was evaluated according to the following criteria.

A: No peeling of the inner sides of the film from each other occurred, and there were no packages with separation or infiltration of juice.
B: Very slight peeling of the inner sides of the film from each other occurred, and there were 1 to 2 packages with infiltration of juice.
C: Partial peeling of the inner sides of the film from each other occurred, and there were 3 to 5 packages with infiltration of juice.
D: A large amount of peeling of the inner sides of the film from each other occurred, and there were 6 or more packages with infiltration of juice, which could not withstand practical use.

Pillow Package Suitability

Pillow package suitability of the heat-shrinkable multilayer film was measured and evaluated by the following method. Specifically, the edges on both sides of the heat-shrinkable multilayer film (tube-shaped) were slit to make a pair of heat-shrinkable multilayer films 380 mm in width, and using these films, pillow packaging bags were produced at a sealing temperature of 180° C., and pillow packaging bags measuring 170 mm wide and 300 mm long were obtained using a horizontal pillow package machine NW406 manufactured by Omori Machinery Co., Ltd. The obtained pillow packaging bag was filled with a cylindrical ham measuring 300 mm in circumference and 200 mm in length, it was vacuum-packaged, and immersed in 90° C. hot water for 10 seconds. Pillow package suitability (suitability for producing a packaging bag) of the heat-shrinkable multilayer film was evaluated based on the following criteria.

Pillow Package Suitability Evaluation Criteria

A: The sealing bar coincided with the portion to be sealed where the films overlapped, and stable packaging could be performed at a film speed of 30 m/min with little shrinkage of the seal portion.
B: There was deviation between the position of the sealing bar and the portion to be sealed where the films overlapped, and stable packaging could not be performed at a film speed of 30 m/min.
C: The film was soft, and it stretched and fused to the sealing bar, and stable packaging was not possible.

The names, summaries, product names, characteristics, and the like of the resin materials used in the working examples and comparative examples given below are as follows.

Ny-A: Nylon 6-66 copolymer; "Amilan CM6241F" manufactured by Toray Industries, Inc. Density: 1.13 g/cm$^3$, melting point: 190° C.

Ny-B: Amorphous Nylon 6I-6T copolymer; "Grivory G21" manufactured by EMS-Chemie Japan, Ltd. Density: 1.18 g/cm$^3$, glass transition temperature: 125° C.

Ny-C: Nylon 6 polymer; "UBE Nylon #1030B" manufactured by Ube Industries, Ltd. Melting point: 220° C.

NY-1: Blend of 80 mass % Ny-A+20 mass % Ny-B

NY-2: Blend of 70 mass % Ny-A+30 mass % Ny-B

NY-3: Blend of 70 mass % Ny-C+30 mass % Ny-B co-PET: Ethylene terephthalate-isophthalate copolymer (terephthalic acid: 88 mol %, isophthalic acid: 12 mol %); "Bellpet IFG-8L" manufactured by Bell Polyester Products, Inc. Density: 1.395 g/cm$^3$, melting point: 228° C., limiting viscosity: 0.8

EVOH: Saponified ethylene-vinyl acetate copolymer (ethylene content: 48%); "EVAL G156B" manufactured by Kuraray Co., Ltd. Melting point: 160° C., MRF: 6.4 g/10 min (190° C., load: 21.18 N)

PVDC: Vinylidene chloride-vinyl chloride copolymer; "Krehalon FB-9" manufactured by Kureha Corp.

EVA-A: Ethylene-vinyl acetate copolymer (vinyl acetate content: 18%); "Escorene Ultra, FL 00218" manufactured by ExxonMobil Chemical Company Density: 0.940 g/cm$^3$, MRF: 1.7 g/10 min (190° C., load: 21.18 N), melting point: 86° C.

EVA-B: Ethylene-vinyl acetate copolymer (vinyl acetate content: 15%); "Ultracene 626" manufactured by Tosoh Corp. Density: 0.936 g/cm$^3$, MRF: 3.0 g/10 min (190° C., load: 21.18 N), melting point: 90° C.

EVA-C: Ethylene-vinyl acetate copolymer (vinyl acetate content: 12%); "Escorene Ultra, FL 00212" manufactured by ExxonMobil Chemical Company Density: 0.934 g/cm$^3$, MRF: 2.5 g/10 min (190° C., load: 21.18 N), melting point: 93° C.

EVA-D: Ethylene-vinyl acetate copolymer (vinyl acetate content: 25%); "Ultracene 640" manufactured by Tosoh Corp. Density: 0.948 g/cm$^3$, MRF: 2.8 g/10 min (190° C., load: 21.18 N), melting point: 78° C.

EVA-1: Blend of 50 mass % EVA-A+50 mass % EVA-C

EEA: Ethylene-ethyl acrylate copolymer; "DPDJ-6182" manufactured by Nippon Unicar Co., Ltd.

VL-1: Very-low-density polyethylene (ethylene-α-olefin copolymer); "Moretec V-0398CN" manufactured by Prime Polymer Co., Ltd. Density: 0.907 g/cm$^3$, melting point: 117° C., MRF: 3.0 g/10 min (190° C., load: 21.18 N)

VL-1: Very-low-density polyethylene; density: 0.908 g/cm$^3$, melting point: 119° C., MRF: 3.0 g/10 min (190° C., load: 21.18 N)

SSC-VLDPE: Very-low-density polyethylene (ethylene-α-olefin copolymer); density: 0.902 g/cm$^3$, melting point: 100° C., MRF: 3.0 g/10 min (190° C., load: 21.18 N)

IO: Ionomer; density: 0.94 g/cm$^3$, melting point: 90° C., MRF: 3.1 g/10 min (190° C., load: 21.18 N), degree of Na ionization: 8%

M-PO: Unsaturated carboxylic acid-modified very-low-density polyethylene; "Admer SF730" manufactured by Mitsui Chemicals, Inc. Density: 0.902 g/cm$^3$, melting point: 119° C., MRF: 2.7 g/10 min (190° C., load: 21.18 N)

Furthermore, the names and summaries of the lubricants used in the inner and outer surface layers of the laminated film in the working examples and comparative examples given below are as follows.

LUB-1: Master batch of inorganic lubricant: co-PET base, containing 2.5 mass % of $SiO_2$ LUB-2: Master batch of inorganic lubricant and organic lubricant: polyethylene (VLDPE) base, containing 4 mass % of $SiO_2$ and 2 mass % of erucamide Working Example 1

Preparation of Heat-Shrinkable Multilayer Film

A heat-shrinkable multilayer film having a six-layer configuration was prepared using the following five types of resin material (1) to (5).

(1) Outer surface layer (A):

Mixture of 92 mass % of the above co-PET, 8 mass % of LUB-1

(2) Intermediate layer (B): The above "Ny-1"

(3) Gas barrier layer (C): The above EVOH (4) Inner surface layer (D): Mixture of 90 mass % of EVA-A, 10 mass % of LUB-2

(5) Adhesion layer (E): The above M-PO

A six-layer heat-shrinkable multilayer film having the layer configuration (A)/(E)/(B)/(C)/(E)/(D) (thickness ratio: 2/1.5/12/4/1.5/19) was produced by the following co-extrusion method using the above five types of resin material ((A) to (E)) of (1) to (5) above. Specifically, the five types of resin material (1) to (5) were individually supplied to five respective extruders, and after melt-kneading each at a resin temperature of 180 to 240° C., the melted resin materials were simultaneously supplied to a co-extrusion annular die so as to result in the above six layers in order from the outer side in the prescribed thickness ratio, and a tube was co-extruded as six layers inside the die. The tube was quenched in a 10 to 18° C. water bath, and a flat tube having a flat width of 136 mm and thickness 325 μm was obtained. Next, the flat tube was passed through an 88° C. hot water bath, and then air was injected into the tube-shaped tube, and it was simultaneously biaxially stretched with a stretch ratio of 290% in the vertical direction (MD) and 310% in the transverse direction (TD) by the inflation method while being cooled with an air ring at a temperature of 15 to 20° C. The biaxially stretched film was then introduced into a heat-treatment pipe 2 m long and heated to 70° C. as a tube shape by steam blown from steam nozzles, and by heat treatment for 2 seconds while relaxing the tube 5% in the vertical direction and 5% in the transverse direction, a heat-shrinkable multilayer film having a folded width of 400 mm and thickness of 40 μm was obtained. The layer configuration (composition and layer thickness) of the obtained heat-shrinkable multilayer film is summarized in Table 1 together with those of the other working examples and comparative examples described below.

Table 2 shows the measurement results of crystal enthalpy ratio of the inner surface layer resin, as well as the measurement and evaluation results of haze, gloss, hot water shrinkage ratio, oxygen permeability, moisture permeability, film producibility, bag-forming processability, bag openability, pillow package suitability, and self-weldability of the heat-shrinkable multilayer film. The measurement results of crystal enthalpy ratio of the inner surface layer resin are summarized in Tables 2 and 3 together with those of the other working examples and comparative examples described below.

Working Example 2

A heat-shrinkable multilayer film was obtained in the same manner as Working Example 1 except that Ny-2 was used for the intermediate layer (B).

Working Example 3

A heat-shrinkable multilayer film was obtained in the same manner as Working Example 1 except that Ny-3 was used for the intermediate layer (B).

Working Example 4

A heat-shrinkable multilayer film was obtained in the same manner as Working Example 1 except that the EVA-A (vinyl acetate content: 18%) of the inner surface layer (D) was changed to EVA-B (vinyl acetate content: 15%).

Working Example 5

A heat-shrinkable multilayer film was obtained in the same manner as Working Example 1 except that the EVA-A (vinyl acetate content: 18%) of the inner surface layer (D) was changed to EVA-1 (vinyl acetate content: 15%).

Working Example 6

A heat-shrinkable multilayer film was obtained in the same manner as Working Example 1 except that the EVA-A of the inner surface layer (D) was changed to EEA.

Working Example 7

A heat-shrinkable multilayer film was obtained in the same manner as Working Example 1 except that the resin thickness configuration of Working Example 1 was changed as shown in Table 1 and the total thickness was 50 μm.

Working Example 8

A heat-shrinkable multilayer film was obtained in the same manner as Working Example 1 except that the resin thickness configuration of Working Example 1 was changed as shown in Table 2 and the total thickness was 70 μm.

Working Example 9

An inner layer (F) comprising VL-2 was inserted between the adhesion layer (E) and the inner surface layer (D) in the layer configuration of Working Example 1, and a heat-shrinkable multilayer film having a seven-layer configuration overall and having the thickness ratio shown in Table 2 was obtained.

Working Example 10

A heat-shrinkable multilayer film was obtained in the same manner as Working Example 1 except that the resin thickness configuration of Working Example 1 was changed as shown in Table 1 and the total thickness was 32 μm.

Comparative Example 1

A heat-shrinkable multilayer film was obtained in the same manner as Working Example 1 except that the EVA-A of the inner surface layer (D) was changed to VL-1 (melting point: 117° C.).

Comparative Example 2

A heat-shrinkable multilayer film was obtained in the same manner as Working Example 1 except that the EVA-A of the inner surface layer (D) was changed to EVA-C (vinyl acetate content: 12%, melting point: 93° C.).

Comparative Example 3

Production of a heat-shrinkable multilayer film was attempted in the same manner as Working Example 1 except that the EVA-A of the inner surface layer (D) was changed to EVA-D (vinyl acetate content: 25%, melting point: 78° C.), but when the flat parison was heated with 88° C. hot water, the inner surfaces of the parison fused together with no opening, and it was not submitted to the stretching step.

Comparative Example 4

According to Working Example 1 of Patent Document 1, a heat-shrinkable multilayer film having a flat width of approximately 400 mm, in which the layer configuration was a seven-layer configuration of SSC-VLDPE/EVA-A/EEA/PVDC/EEA/EVA-B/IO from the outer layer side of the film as shown in Table 1 (wherein the EVA-A contained 0.2 mass % of erucamide and 0.2 mass % of stearic acid mono- and diglyceride boric acid ester, and the IO contained 2 mass % of silica and 0.38 mass % of erucamide), in which the thicknesses of the layers in the above layer configuration were 3/22/1.5/7/1.5/15/10 μm (total thickness 60 μm), was produced by the following co-extrusion method. Specifically, the six types of resin material shown in Table 1 were individually supplied to six respective extruders, and after melt-kneading each at a resin temperature of 180 to 200° C., the melted resin materials were simultaneously supplied to a co-extrusion annular die so as to result in the above seven layers in order from the outer side with the prescribed thickness ratio, and a tube was co-extruded as seven layers inside the die. The tube was quenched in a 10 to 18° C. water bath, and a flat tube was obtained. Then, the flat tube was subjected to electron beam radiation from the outside of the tube in an electron beam irradiation device with an acceleration voltage of 300 KeV to result in a radiation dose of 80 kGy. Next, it was passed through an 82° C. hot water bath, and then air was injected into the tube-shaped tube, and it was simultaneously biaxially stretched with a stretch ratio of 310% in the vertical direction (MD) and 300% in the transverse direction (TD) by the inflation method while being cooled with an air ring at a temperature of 15 to 20° C. The results of measuring and evaluating the various characteristics of this heat-shrinkable multilayer film are shown in Table 4. The adhesion strength of self-weldability of the inner side after 80° C. hot water treatment was 11.4 N/15 mm, and partial delamination (peeling) of the inner layers occurred in the fresh meat package hexagonal rotation test, and juice seeped out to result in a poor appearance. Additionally, because the film was soft and heat resistance of the outer surface layer was unsatisfactory, pillow package suitability was poor.

Comparative Example 5

A heat-shrinkable multilayer film was produced by co-extrusion according to Working Example 4 of Patent Document 1. Specifically, a heat-shrinkable multilayer film was produced in the same manner as Working Example 1 except that the resin materials and thickness configuration were changed as shown in Table 1, wherein VL-2 was used in the inner surface layer (D), NY-A was used in the intermediate layer (B), and the resin layer configuration was changed to (A)/(E)/(B)/(C)/(E)/(D) (thickness ratio: 2/1.5/7/5/1.5/21) (total thickness: 38 μm). The production conditions were the same as Working Example 1 except that the hot water bath temperature before stretching was 90° C., the stretch ratio was 300% in the vertical direction and 310% in the transverse direction, and in the subsequent heat treatment step, it was relaxed 10% in the vertical direction and 10% in the transverse direction. The results of measuring and evaluating the same characteristics as Working Example 1 are shown in Table 3. Specifically, there was no adhesion strength (0 Newtons) of self-weldability of the inner sides, and after the fresh meat package hexagonal rotation test, the inner surface layers had peeled and a lot of juice had seeped out to result in a poor appearance.

A summary of the layer configurations of the heat-shrinkable multilayer films according to the above working examples and comparative examples is shown in Table 1, and a summary of the evaluation results is shown in Tables 2 and 3.

TABLE 1

| | | Layer configuration of heat-shrinkable multilayer film | | | | |
|---|---|---|---|---|---|---|
| | | Outer surface layer | Mass ratio | Adhesion layer (E) | Intermediate layer (B) | Gas barrier layer (C) |
| Working Example 1 | | co-PET LUB-1 | 92 8 | M-PO | Ny-1 | EVOH |
| | Thickness (μm) | 2 | | 1.5 | 12 | 4 |
| Working Example 2 | | co-PET LUB-1 | 92 8 | M-PO | Ny-2 | EVOH |
| | Thickness (μm) | 2 | | 1.5 | 12 | 4 |
| Working Example 3 | | co-PET LUB-1 | 92 8 | M-PO | Ny-3 | EVOH |
| | Thickness (μm) | 2 | | 1.5 | 12 | 4 |
| Working Example 4 | | co-PET LUB-1 | 92 8 | M-PO | Ny-1 | EVOH |
| | Thickness (μm) | 2 | | 1.5 | 12 | 4 |
| Working Example 5 | | co-PET LUB-1 | 92 8 | M-PO | Ny-1 | EVOH |
| | Thickness (μm) | 2 | | 1.5 | 12 | 4 |
| Working Example 6 | | co-PET LUB-1 | 92 8 | M-PO | Ny-1 | EVOH |
| | Thickness (μm) | 2 | | 1.5 | 12 | 4 |
| Working Example 7 | | co-PET LUB-1 | 92 8 | M-PO | Ny-1 | EVOH |
| | Thickness (μm) | 2 | | 1.5 | 15 | 8 |
| Working Example 8 | | co-PET LUB-1 | 92 8 | M-PO | Ny-1 | EVOH |
| | Thickness (μm) | 3 | | 2 | 20 | 4 |
| Working Example 9 | | co-PET LUB-1 | 92 8 | M-PO | Ny-1 | EVOH |
| | Thickness (μm) | 2 | | 1.5 | 12 | 4 |
| Working Example 10 | | co-PET LUB-1 | 92 8 | M-PO | Ny-1 | EVOH |
| | Thickness (μm) | 2 | | 1 | 11 | 3 |
| Comparative Example 1 | Composition | co-PET LUB-1 | 92 8 | M-PO | Ny-1 | EVOH |
| | Thickness (μm) | 2 | | 1.5 | 12 | 4 |
| Comparative Example 2 | Composition | co-PET LUB-1 | 92 8 | M-PO | Ny-1 | EVOH |
| | Thickness (μm) | 2 | | 1.5 | 12 | 4 |
| Comparative Example 3 | Composition | co-PET LUB-1 | 92 8 | M-PO | Ny-1 | EVOH |
| | Thickness (μm) | 2 | | 1.5 | 12 | 4 |
| Comparative Example 4 | | SSC-VLDPE | 100 | EVA-A | EEA | PVDC |
| | Thickness (μm) | 3 | | 22 | 1.5 | 7 |
| Comparative Example 5 | Composition | co-PET LUB-1 | 98 2 | M-PO | Ny-A | EVOH |
| | Thickness (μm) | 2 | | 1.5 | 7 | 5 |

| | | Layer configuration of heat-shrinkable multilayer film | | | | Total thickness (μm) |
|---|---|---|---|---|---|---|
| | | Adhesion layer (E) | Inner layer (F) | Inner surface layer (D) | Mass ratio | |
| Working Example 1 | | M-PO | | EVA-A LUB-2 | 90 10.0 | |
| | Thickness (μm) | 1.5 | | 19 | | 40 |
| Working Example 2 | | M-PO | | EVA-A LUB-2 | 90 10.0 | |
| | Thickness (μm) | 1.5 | | 19 | | 40 |
| Working Example 3 | | M-PO | | EVA-A LUB-2 | 90 10.0 | |
| | Thickness (μm) | 1.5 | | 19 | | 40 |
| Working Example 4 | | M-PO | | EVA-B LUB-2 | 90 10.0 | |
| | Thickness (μm) | 1.5 | | 19 | | 40 |
| Working Example 5 | | M-PO | | EVA-1 LUB-2 | 90 10.0 | |
| | Thickness (μm) | 1.5 | | 19 | | 40 |

TABLE 1-continued

| | | | | | |
|---|---|---|---|---|---|
| Working Example 6 | | M-PO | | EEA<br>LUB-2 | 90<br>10.0 |
| | Thickness (μm) | 1.5 | | 19 | 40 |
| Working Example 7 | | M-PO | | EVA-A<br>LUB-2 | 90<br>10.0 |
| | Thickness (μm) | 1.5 | | 22 | 50 |
| Working Example 8 | | M-PO | | EVA-A<br>LUB-2 | 90<br>10.0 |
| | Thickness (μm) | 2 | | 39 | 70 |
| Working Example 9 | | M-PO | VL-2 | EVA-A<br>LUB-2 | 90<br>10.0 |
| | Thickness (μm) | 1.5 | 15 | 4 | 40 |
| Working Example 10 | | M-PO | | EVA-A<br>LUB-2 | 90<br>10.0 |
| | Thickness (μm) | 1 | | 14 | 32 |
| Comparative Example 1 | Composition | M-PO | | VL-1<br>LUB-2 | 90<br>10.0 |
| | Thickness (μm) | 1.5 | | 19 | 40 |
| Comparative Example 2 | Composition | M-PO | | EVA-C<br>LUB-2 | 90<br>10.0 |
| | Thickness (μm) | 1.5 | | 19 | 40 |
| Comparative Example 3 | Composition | M-PO | | EVA-D<br>LUB-2 | 90<br>10.0 |
| | Thickness (μm) | 1.5 | | 19 | 40 |
| Comparative Example 4 | | EEA | EVA-B | IO | 100 |
| | Thickness (μm) | 1.5 | 15 | 10 | 60 |
| Comparative Example 5 | Composition | M-PO | | VL-2<br>LUB-2 | 9.7<br>3.0 |
| | Thickness (μm) | 1.5 | | 21 | 38 |

TABLE 2

| | Units | Working Example 1 | Working Example 2 | Working Example 3 | Working Example 4 | Working Example 5 |
|---|---|---|---|---|---|---|
| Total thickness | μm | 40 | 40 | 40 | 40 | 40 |
| Crystal enthalpy ratio of inner surface layer resin | % | 61.4 | 61.4 | 61.4 | 56.6 | 58.7 |
| Haze | % | 8 | 7 | 8 | 7 | 8 |
| Gloss MD/TD | % | 105/106 | 106/107 | 108/107 | 110/109 | 120/121 |
| Hot water shrinkage ratio MD/TD | % | 29/34 | 31/35 | 26/28 | 28/32 | 30/33 |
| Oxygen permeability (23° C., 80% RH) | *1 | 23 | 23 | 22 | 23 | 23 |
| Moisture permeability (40° C., 90% RH) | *2 | 30 | 33 | 32 | 28 | 32 |
| Puncture strength (surface) | N | 17 | 18 | 18 | 17 | 17 |
| Seal strength | N/15 mm | 27 | 27 | 28 | 29 | 30 |
| Film producibility | | A | A | A | A | A |
| Bag-forming processability | | A | A | A | A | A |
| Bag openability | | A | A | A | A | A |
| Pillow package suitability | | A | A | A | A | A |
| Self-weldability | | | | | | |
| Adhesion strength of inner surface | N/15 mm | 28 | 27 | 29 | 14 | 16 |
| Abuse test determination | | A | A | A | B | B |
| Juice visibility determination | | | | | | |

| | Units | Working Example 6 | Working Example 7 | Working Example 8 | Working Example 9 | Working Example 10 |
|---|---|---|---|---|---|---|
| Total thickness | μm | 40 | 50 | 70 | 40 | 32 |
| Crystal enthalpy ratio of inner surface layer resin | % | 50.1 | 61.4 | 61.4 | 61.4 | 61.4 |
| Haze | % | 8 | 9 | 10 | 8 | 6 |
| Gloss MD/TD | % | 110/112 | 111/113 | 103/105 | 120/122 | 120/122 |
| Hot water shrinkage ratio MD/TD | % | 29/33 | 30/34 | 29/32 | 28/32 | 30/33 |
| Oxygen permeability (23° C., 80% RH) | *1 | 23 | 12 | 18 | 22 | 26 |
| Moisture permeability (40° C., 90% RH) | *2 | 34 | 29 | 22 | 25 | 36 |
| Puncture strength (surface) | N | 17 | 20 | 23 | 18 | 15 |
| Seal strength | N/15 mm | 25 | 29 | 45 | 35 | 22 |

TABLE 2-continued

| | | | | | | |
|---|---|---|---|---|---|---|
| Film producibility | | A | A | A | A | A |
| Bag-forming processability | | A | A | A | A | A |
| Bag openability | | A | A | A | A | A |
| Pillow package suitability | | A | A | A | A | A |
| Self-weldability | | | | | | |
| Adhesion strength of inner surface | N/15 mm | 27 | 29 | 30 | 26 | 24 |
| Abuse test determination | | A | A | A | A | A |
| Juice visibility determination | | | | | | |

*1 Oxygen permeability Units: $cm^3/m^2/24\ h \cdot atm$
*2 Moisture permeability Units: $g/m^2/24\ h$

TABLE 3

| | Unit | Comparative Example 1 | Comparative Example 2 | Comparative Example 3 | Comparative Example 4 | Comparative Example 5 |
|---|---|---|---|---|---|---|
| Total thickness | μm | 40 | 40 | 40 | 60 | 38 |
| Crystal enthalpy ratio of inner surface layer resin | % | 18.6 | 41.1 | 86.7 | 39 | 18.5 |
| Haze | % | 8 | 8 | — | 9 | 8 |
| Gloss MD/TD | % | 122/121 | 126/115 | — | 103/104 | 128/127 |
| Hot water shrinkage ratio MD/TD | % | 28/32 | 29/32 | — | 49/50 | 17/19 |
| Oxygen permeability (23° C., 80% RH) | *1 | 21 | 23 | — | 25 | 21 |
| Moisture permeability (40° C., 90% RH) | *2 | 20 | 33 | — | 10 | 18 |
| Puncture strength (surface) | N | 18 | 16 | — | 12 | 13 |
| Seal strength | N/15 mm | 30 | 28 | — | 25 | 29 |
| Film producibility | | A | A | C | A | A |
| Bag-forming processability | | A | A | — | A | A |
| Bag openability | | A | A | — | A | A |
| Pillow package suitability | | A | A | — | B | A |
| Self-weldability | | | | | | |
| Adhesion strength of inner surface | N/15 mm | 0 | 1.8 | — | 11 | 0 |
| Abuse test determination | | | | | | |
| Juice visibility determination | | D | D | — | B | D |

*1 Oxygen permeability Units: $cm^3/m^2/24\ h \cdot atm$
*2 Moisture permeability Units: $g/m^2/24\ h$

INDUSTRIAL APPLICABILITY

As is clear from the evaluation results shown in Tables 2 and 3, the present invention provides a polyamide-based heat-shrinkable multilayer film having optimal characteristics for applications that primarily require strength, and having greatly improved self-weldability demanded in packaging films for meat products such as fresh and processed meats. Additionally, the above heat-shrinkable multilayer film enables comprehensive improvements, such as providing the surface gloss and suitability for printing or label adhesion desired in packaging applications of meat products such as fresh meat or processed meat. The heat-shrinkable multilayer film further enables improvements such as the heat-shrinkability, strength, heat resistance, moldability, suitability for various types of packaging, gas barrier capability, moisture barrier capability, and rapid sealing suitability generally desired in films for food packaging.

The invention claimed is:

1. A packaging bag comprising a heat-shrinkable multilayer film, wherein
the heat-shrinkable multilayer film comprises:
an outer surface layer (A) comprising a heat-resistant thermoplastic resin;
an intermediate layer (B) comprising a polyamide-based resin; and
an inner surface layer (D) comprising an ethylene-based copolymer, wherein
the ethylene-based copolymer comprises ethylene-vinyl acetate copolymer,
the packaging bag is formed of the heat-shrinkable multilayer film so that the inner surface layer (D) forms an inner wall of the packaging bag to contain fresh meat and the inner surface layer (D) directly contacts the fresh meat,
the heat-shrinkable multilayer film is produced by a method comprising the steps of:
co-extruding a plurality of melted thermoplastic resins in tubular form from a number of extruders corresponding to a number of layers of the the multilayer film, to form a tubular body having the outer surface layer (A), the intermediate layer (B), and the inner surface layer (D);

water-cooling the tubular body to not greater than a melting point of a primary resin contained in each of the layers; reheating the tubular body using 88 to 90° C. hot water; stretching the tubular body 250% to 400% in a vertical direction and a circumferential direction while pulling the tubular body in the vertical direction while inserting fluid inside the tubular body, to form a biaxially stretched tubular film; and performing relaxation heat treatment using 60 to 98° C. steam or hot water from a side nearest the outer surface layer (A) of the biaxially stretched tubular body that has been re-formed by inserting fluid inside of the folded film such that respective relaxation ratios in the vertical direction and the circumferential direction are from 2 to 25%, and the ethylene-based copolymer of the inner surface layer (D) has a melting point measured by a differential scanning calorimeter in conformance with JIS K7121 of 80 to 90° C., so that i) the inner surface layers (D) are not fused to each other during production of the multilayer film and ii) the inner surface layers (D) of the packaging bag are adhered to each other and the packaging bag has a self-welding strength of not less than 10 N/15 mm, the self-welding strength being an adhesion strength of the inner surface layer (D) at an edge of the packaging bag in which the meat is contained.

2. The packaging bag according to claim 1, wherein a gas barrier layer (C) is inserted between the outer surface layer (A) and the inner surface layer (D).

3. The packaging bag according to claim 2, wherein the gas barrier layer (C) comprises an ethylene-vinyl alcohol copolymer.

4. The packaging bag according to claim 1, wherein the heat-resistant thermoplastic resin that constitutes the outer surface layer (A) comprises a polyester-based resin or a polyamide-based resin.

5. The packaging bag according to claim 1, wherein the self-welding strength of the inner surface layer is not less than 15 N/15 mm.

6. The packaging bag according to claim 1, wherein the intermediate layer (B) comprises a resin composition of 60 to 95 mass % of polyamide 6 polymer, polyamide 6-66 copolymer, polyamide 6-12 copolymer, or polyamide 6-66-12 copolymer, and 5 to 40 mass % of polyamide 6I-6T copolymer.

7. The packaging bag according to claim 1, wherein the inner surface layer (D) comprises the ethylene-vinyl acetate copolymer of which a vinyl acetate content is from 15 to 25 mass %.

8. The packaging bag according to claim 1, wherein the heat-resistant thermoplastic resin of the outer surface layer (A) is a copolymer polyester comprising a polycondensate of isophthalic acid and terephthalic acid with ethylene glycol.

9. The packaging bag according to claim 1, wherein the ethylene-based copolymer that constitutes the inner surface layer (D) has a crystal melting enthalpy ratio at specified temperature 80° C. measured by a differential scanning calorimeter in conformance with JIS K7121 of not less than 50%.

10. The packaging bag according to claim 1, wherein the intermediate layer (B) comprises a resin composition of 70 to 80 mass % of polyamide 6 polymer or polyamide 6-66 copolymer, and 20 to 30 mass % of polyamide 6I-6T copolymer.

11. The packaging bag according to claim 1, wherein the heat-shrinkable multilayer film further comprises an inner layer (F) comprising a very-low-density linear polyethylene between the intermediate layer (B) and the inner surface layer (D).

12. The packaging bag according to claim 1, wherein a thickness of the inner surface layer (D) is 10 to 150 μm.

13. A method for producing the packaging bag comprising the heat-shrinkable multilayer film described in claim 1, wherein the heat-shrinkable multilayer film is produced by the method comprising the steps of:

co-extruding the plurality of melted thermoplastic resins in tubular form from the number of extruders corresponding to the number of layers of the multilayer film, to form the tubular body having the outer surface layer (A) comprising the heat-resistant thermoplastic resin, the intermediate layer (B) comprising the polyamide-based resin, and the inner surface layer (D) comprising the ethylene-based copolymer;

water-cooling the tubular body to not greater than the melting point of the primary resin contained in each of the layers; reheating the tubular body using 88 to 90° C. hot water; stretching the tubular body 250% to 400% in the vertical direction and the circumferential direction while pulling the tubular body in the vertical direction while inserting fluid inside the tubular body, to form the biaxially stretched tubular film; and performing relaxation heat treatment using 60 to 98° C. steam or hot water from the side nearest the outer surface layer (A) of the biaxially stretched tubular body that has been re-formed by inserting fluid inside of the folded film such that respective relaxation ratios in the vertical direction and the circumferential direction are from 2 to 25%.

14. A method for producing a packaged fresh meat product, the method comprising the steps of:

putting the fresh meat in the packaging bag described in claim 1, wherein the packaging bag is hollow and cylindrical, and has a seal portion at one end and an open edge at the other end while leaving an excess region near the open end;

forming a seal portion on the open edge while evacuating an interior of the bag, to perform vacuum packaging; and causing hot water to act on the vacuum package, to heat-shrink the packaging bag and self-weld the inner surface layers (D) that form the excess region with each other.

15. The packaged fresh meat product formed by the method described in claim 14.

16. A method for removing the fresh meat product from the packaged fresh meat product described in claim 15, the method comprising the steps of:

after the packaged fresh meat product has been stored frozen, cutting open the excess region of the bag near the fresh meat filled region; and removing the fresh meat.

* * * * *